United States Patent
Zheng et al.

(10) Patent No.: US 8,638,695 B2
(45) Date of Patent: Jan. 28, 2014

(54) TREE-GUIDED DISTRIBUTED LINK STATE ROUTING METHOD

(75) Inventors: Jianliang Zheng, New York, NY (US); Myung-Jong Lee, New York, NY (US); Jin-Sae Jung, Seongnam-si (KR)

(73) Assignees: Samsung Electronics Co., Ltd., Suwon-si (KR); The Research Foundation of the City University of New York, West New York, NY (US)

( * ) Notice: Subject to any disclaimer, the term of this patent is extended or adjusted under 35 U.S.C. 154(b) by 635 days.

(21) Appl. No.: 11/723,196

(22) Filed: Mar. 16, 2007

(65) Prior Publication Data

US 2007/0217346 A1    Sep. 20, 2007

Related U.S. Application Data

(60) Provisional application No. 60/782,625, filed on Mar. 16, 2006.

(30) Foreign Application Priority Data

Aug. 18, 2006  (KR) ................................. 2006-78324

(51) Int. Cl.
*H04L 12/28* (2006.01)
*H04L 12/56* (2011.01)

(52) U.S. Cl.
CPC ..................................... *H04L 45/48* (2013.01)
USPC ........... 370/256; 370/254; 370/255; 370/351; 370/378; 370/379

(58) Field of Classification Search
None
See application file for complete search history.

(56) References Cited

U.S. PATENT DOCUMENTS

| 6,192,051 | B1 | 2/2001 | Lipman et al. |
| 6,704,320 | B1 | 3/2004 | Narvaez et al. |
| 6,836,463 | B2 | 12/2004 | Garcia-Luna-Aceves et al. |
| 2002/0062388 | A1* | 5/2002 | Ogier et al. .................... 709/238 |
| 2003/0118051 | A1* | 6/2003 | Ooms ........................... 370/471 |
| 2005/0036486 | A1 | 2/2005 | Sahinoglu et al. |

(Continued)

FOREIGN PATENT DOCUMENTS

| JP | 2005-051650 A | 2/2005 |
| JP | 2005-065267   | 3/2005 |

(Continued)

OTHER PUBLICATIONS

Moy, "OSPF version 2", Apr. 1998, RFC 2328.*

(Continued)

*Primary Examiner* — Faruk Hamza
*Assistant Examiner* — Aixa A Guadalupe-Cruz
(74) *Attorney, Agent, or Firm* — NSIP Law (57) ABSTRACT

A routing method of a wireless communication system is provided implementing advantageous features of both the tree routing and the link state routing. In the routing method, the system generates an adaptive tree table which defines a network in a tree structure of at least one branch with at least one node and each node generates a link state table which includes information on neighbor nodes, such that the packets are routed on the basis of the adaptive tree table and the link state table. Advantageous mechanisms of the tree routing and the link state routing are combined, thereby it is possible to eliminate most single point of failures of conventional tree routing and provide shorter paths compared with conventional tree routing.

17 Claims, 3 Drawing Sheets

(56) References Cited

U.S. PATENT DOCUMENTS

| | | | |
|---|---|---|---|
| 2005/0047390 | A1 | 3/2005 | Park et al. |
| 2005/0111349 | A1 | 5/2005 | Vasseur et al. |
| 2005/0111375 | A1 | 5/2005 | Ravindran et al. |
| 2005/0249155 | A1* | 11/2005 | Seo et al. .................. 370/328 |
| 2007/0280192 | A1 | 12/2007 | Yagyu et al. |

FOREIGN PATENT DOCUMENTS

| | | |
|---|---|---|
| JP | 2005-080316 | 3/2005 |
| KR | 10-2001-0016690 | 3/2001 |
| WO | WO 2005/079025 A1 | 8/2005 |

OTHER PUBLICATIONS

Turgay Korkmaz et al. "Hybrid Flooding and Tree-Based Broadcasting for Reliable and Efficient Link-State Dissemination", Nov. 2002 IEEE; pp. 2400-2404.

Yih Huang et al. "Tree-Based Link-State Routing In the Presence of Routing Information Corruption", Oct. 1999, 1999 IEEE; pp. 364-370.

Nirwan Ansari et al., "Efficient and Reliable Link State Information Dissemination" ,IEEE Communication Letters vol. 8.; No. 5.; May 2004; 2004 IEEE; pp. 217-219.

Zheng, Jialiang, "Project: IEEE P802.15 Working Group for Wireless Personal Area Networks (WPANs)," *IEEE 802.15-06//128r0*, Mar. 2006, Slides 1-47.

Shao, Huai-Rong, "Preliminary Draft of Baseline Document for 802.15.5 Mesh Networking," IEEE 15-05-0552-02-0005, Nov. 2015, pp. 1-47.

European Search Report issued on Oct. 27, 2010, in corresponding European Patent Application No. 07715679.2 (4 pages).

Zheng, Jianliang, et al., "Project: IEEE P802.15 Working Group for Wireless Personal Area Networks (WPANs)," IEEE 802.15.5 WPAN Mesh Networks, May 12, 2005, IEEE 802.15-05-0256 (21 pages, in English).

Chinese Office Action issued Sep. 14, 2011, in counterpart Chinese Application No. 200780008369.5 (6 pages).

Japanese Office Action issued on Apr. 19, 2011, in corresponding Japanese Application No. 2009-500297 (2 pages).

Kawamoto et al., "Performance Evaluation of Routing Protocol in Sensor Networks (ZigBee) concerning Connectivity to IP Networks," *IEICE Technical Report*, vol. 105, No. 628, Feb. 2006, pp. 31-36.

Chinese Examination Report issued Apr. 20, 2012 in counterpart Chinese Application No. 200780008369.5 (6 pages, in Chinese).

Jianliang Zheng et al., "IEEE 802.15.5 WPAN Mesh Networks," IEEE P802.15 Working Group for Wireless Personal Area Networks (WPANs), May 13, 2005 (24 pages, in English).

Korean Decision of Grant issued Mar. 21, 2013 in counterpart Korean Application No. 10-2006-0078324 (6 pages, in Korean, including partial English translation).

* cited by examiner

TREE-GUIDED DISTRIBUTED LINK STATE ROUTING METHOD

CROSS-REFERENCE TO RELATED APPLICATIONS

This application claims the benefit under 35 U.S.C. §119(e) of U.S. Provisional Application No. 60/782,625, filed Mar. 16, 2006, in the United States Patent and Trademark Office, and the benefit under 35 U.S.C. §119(a) of Korean Patent Application No. 2006-78324, filed Aug. 18, 2006, in the Korean Intellectual Property Office, the entire contents of each of which are hereby incorporated by reference.

BACKGROUND OF THE INVENTION

1. Field of the Invention

The present invention relates to a routing method for wireless communication systems. More particularly, the present invention relates to a routing method for wireless communication systems, which is implemented with advantageous features of both the tree routing and the link state routing.

2. Background of the Related Art

Before nodes in a wireless network can communicate with each other, it is first necessary to discover a route. Tree structure is useful for routing purposes since the routing can be done without going through route discovery by binding logical addresses to the tree structure. Also, the tree routing eliminates the initial delay caused by route discovery and saves storage space otherwise needed for routing table.

However, the tree routing is disadvantageous because of non-optimal routes and single point of failures (SPFs).

SUMMARY OF THE INVENTION

Accordingly, exemplary embodiments of the present invention address at least the above problems and disadvantages, and an object of exemplary embodiments of the present invention is to provide a routing method of a wireless communication system which is capable of adaptively assigning logical addresses.

Another objective of the exemplary embodiments of the present invention is to provide a routing method of a wireless communication system which is capable of efficiently handling the single point of failure (SPF).

Another objective of the exemplary embodiments of the present invention is to provide a routing method of a wireless communication system which is capable of improving robustness and route optimization.

In an aspect of the exemplary embodiments of the present invention, the above and other objectives can be accomplished by a routing method of wireless communication system including a plurality of nodes. The routing method includes the steps of generating an adaptive tree table which defines a network in a tree structure of at least one branch with at least one node, generating, at each node, a link state table which includes information on neighbor nodes, and routing packets on the basis of the adaptive tree table and the link state table.

In another aspect of the present invention, the step of generating the adaptive tree table includes initializing the adaptive tree table, determining whether or not there is a change of the network; and modifying the adaptive tree table if the network is changed.

In another aspect of the exemplary embodiments of the present invention, the step of initializing the adaptive table includes associating the nodes with branches, as a root, intermediate, and leaf nodes and assigning addresses to those nodes.

In another aspect of the exemplary embodiments of the present invention, the step of associating the nodes considers each node's capability when it decides whether to accept another node as a child.

In another aspect of the exemplary embodiments of the present invention, the node capability is indicated by acceptance degree.

In another aspect of the exemplary embodiments of the present invention, the acceptance degree includes an acceptance without reservation, an acceptance with reservation, an acceptance with reluctance, and a reject.

In another aspect of the exemplary embodiments of the present invention, the step of assigning addresses includes determining total number of the nodes of the network is equal to or less than total number of available addresses and allocating addresses to the nodes if the total number of the nodes is equal to or less than the total number of available addresses.

In another aspect of the exemplary embodiments of the present invention, the step of determining the total number of the nodes includes receiving, at each node, numbers of nodes of respective branches of the child node and calculating, at the root node, the total number of the nodes by summing the numbers of the nodes of the branches of the nodes right below the root node.

In another aspect of the exemplary embodiments of the present invention, the step of generating the link state table includes exchanging link state information among neighbors within the predetermined number of hops and updating, at each node, the link state table on the basis of the link state information.

In another aspect of the exemplary embodiments of the present invention, the exchanged link state information includes beginning and ending addresses of an address block assigned to the node, a tree level of the node in the adaptive tree, one-hop neighbors of the node.

In another aspect of the exemplary embodiments of the present invention, the link state table includes a maximum-hop neighbor list and a connectivity matrix.

In another aspect of the exemplary embodiments of the present invention, the maximum-hop neighbor list includes a beginning address of an address block owned by $n_{th}$ node ($begAddr_n$), an ending address of an address block owned by $n_{th}$ node ($endAddr_n$), a tree level of $n_{th}$ node in the adaptive tree ($tree\_level_n$), and a number of hops to $n_{th}$ node ($hops_n$).

In another aspect of the exemplary embodiments of the present invention, the number of hops to $n_{th}$ node ($hops_n$) is calculated using the connectivity matrix.

In another aspect the exemplary embodiments of the present invention, the step of routing the packets includes guiding the packet on the basis of the adaptive tree table and routing the packets to the next hop on the basis of the link state table.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, like reference numerals will be understood to refer to like parts, components and structures.

DETAILED DESCRIPTION OF EXEMPLARY EMBODIMENTS

The matters defined in the description such as a detailed construction and elements are provided to assist in a comprehensive understanding of the embodiments of the invention and are merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

An exemplary implementation of a routing algorithm according to an exemplary embodiment of the present invention is referenced herein as Tree-guided Distributed Link State (TDLS) algorithm which combines adaptive tree routing and link state routing.

The tree structure is used as a guideline to tell towards which direction rather than exact next hop a packet should be relayed. The exact next hop information is derived from each relaying node's local link state table. Some of the non-limiting features of the TDLS according to an exemplary embodiment of the present invention are reduced complexity, adaptive address assignment, and a distributed link state.

For example, TDLS is reduced in complexity because of no route discovery and no route repair. TDLS assigns the addresses in consideration of the network topology. TDLS has essentially no limitation on the number of children, address block size, and maximum tree levels. Also, TDLS has essentially no "running-out-of address" problem. Furthermore, the distributed link state technique improves the scalability, provides multiple paths and robustness, and makes the path shorter.

In an exemplary embodiment of the present invention, each node keeps an adaptive tree table as follows:

TABLE 1

| num_branch | |
|---|---|
| $beg\_addr_1$ | $end\_addr_1$ |
| $beg\_addr_2$ | $end\_addr_2$ | where num_branch is the number of branches the node has, beg_addr is the beginning address of branch i (i=1, 2, 3, ... ), end_addr is the ending address of branch i (i=1, 2, 3, ... ). Each branch is assigned a block of consecutive addresses. In exemplary implementation, it is not necessary to assign consecutive blocks to those branches.

In an exemplary embodiment of the present invention, the TDLS introduces two phases: initialization (configuration) phase and operation phase. During the initialization phase, nodes join the network and a tree is formed. After initialization, the network enters operation phase, in which normal communications start. During the operation phase, new nodes are still allowed to join the network, but the number of new nodes should be small compared with the number of nodes already in the network. If there is a big change of either the number of nodes or the network topology, the initialization can be repeated.

The adaptive tree formation procedure is divided into two stages: association and address assignment stages.

During the association stage, beginning from the root (normally designated manually, for example, by pressing a button), nodes gradually join the network and a tree is formed. This tree does not yet constitute an adaptive tree, since none of the nodes has been assigned an address. There is essentially no limitation on the number of children a node can accept. A node can determine by itself how many nodes (therefore, how many branches) it will accept according to its capability and other factors. However, it is possible that a node cannot find any other node to associate if the number of children is not flexible. Therefore, instead of accepting or rejecting an association request, a node uses an acceptance degree (AD) to indicate the willingness of acceptance, for example, a four level AD could be used:

3—accept without reservation
2—accept with reservation
1—accept with reluctance
0—reject (a node should try to avoid this AD unless absolutely necessary)

When a node receives multiple association responses, it should choose the node with the highest AD for association, unless there are other high priority factors indicate not to do so. Using AD increases the chance with which a node successfully joins the network without severely overloading an individual node.

After a branch reaches its bottom, that is, no more nodes wait to join the network (a suitable timer can be used for this purpose), a down-top procedure is used to calculate the number of nodes along each branch.

Figure 1:
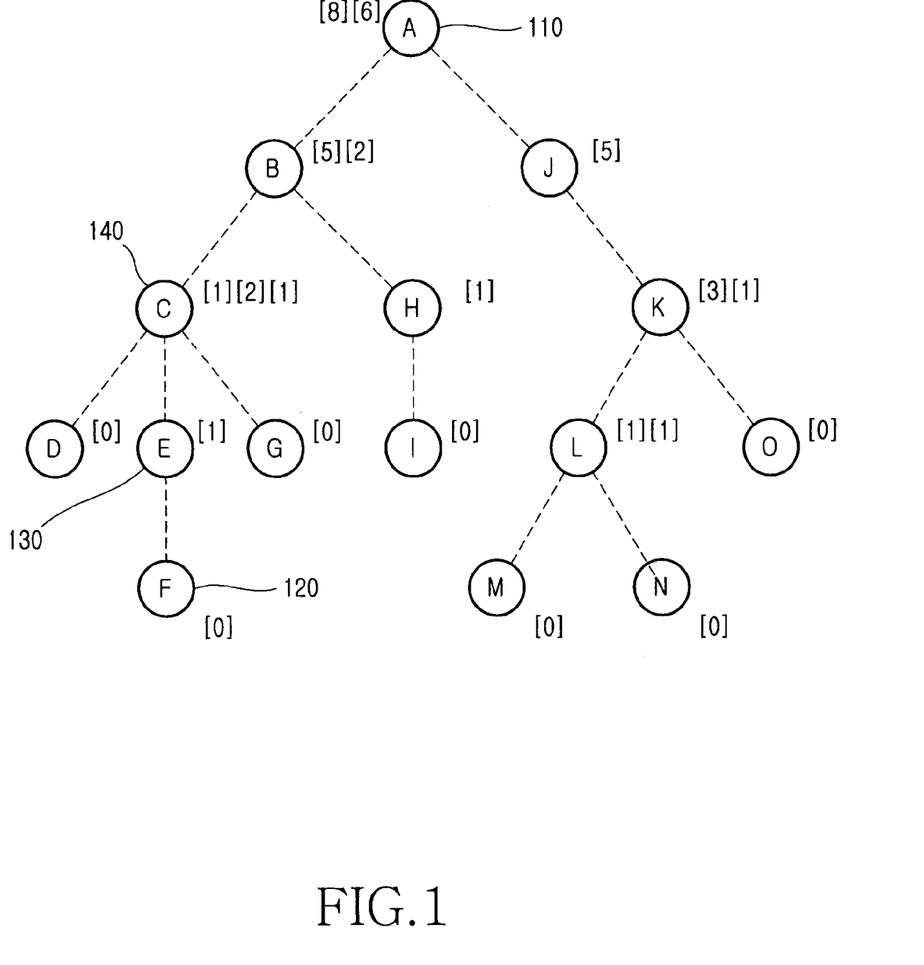
FIG. 1 is a graph illustrating a wireless network according to an exemplary embodiment of the present invention.

FIG. 1 is a graph for explaining a routing method of a wireless network according to an exemplary embodiment of the present invention.

In FIG. 1, the numbers in square brackets indicate the numbers of nodes within branches below a certain node. For example, the node A 110 has two branches. The first branch includes 8 nodes B, C, D, E, F, G, H, and I and the second branch includes 6 nodes J, K, L, M, N, and O.

When the numbers of nodes are reported from the bottom to top, each node can also indicate a desirable number of addresses. For example, node F 120 can indicate it whishes to get 3 addresses (2 for possible future extension), though currently only one address is enough for itself. Node E 130 can indicate it wishes to get 5 addresses (3 for node F, 1 for itself, and 1 for future extension). After the root node A 110 receives the information from all the branches, it begins to assign addresses.

During address assigning stage, a top-down procedure is used. First, the root node A 110 checks if the total number of nodes in the network is less than the total number of addresses: available. If not, address assignment fails. A possible solution in case of address overflow is to separate the network into smaller ones or increase the address space. In an exemplary embodiment of the present invention, it is assumed there is no address overflow. Next, the root node A 110 assigns a block of consecutive addresses to each branch below it, taking into account the actual number of nodes and the wished number of address. In exemplary implementation, the actual number of addresses assigned could be less than the wished one (but no less than the actual number of nodes) or more than the wished one, depending on the availability of addresses. This procedure continues until the bottom of the tree. After the address assignment, an adaptive tree is formed and each node has an adaptive tree table for tracking branches below it. For example, node C 140 can have an adaptive tree table as follows:

TABLE 2

|  | [3] |  |
|---|---|---|
| [6] |  | [8] |
| [9] |  | [13] |
| [14] |  | [14] |

The table 2 indicates that the node C 140 has 3 branches, the first to third branches of the node C 140 own address blocks [6, 7, 8], [9, 10, 11, 12, 13], and [14], respectively.

After the adaptive tree table is formed, the network enters operation phase. Using the adaptive tree table, a packet can be more easily routed. For example, when a packet is received, node C 140 checks if the destination address of the packet belongs to one of its branches.

If the destination address of the packet belongs to $i^{th}$ branch, the packet is routed through the node with $beg\_addr_i$ of the $i^{th}$ branch. If the destination address of the packet does not belong to any branch, it is routed to the parent of node C 140.

Although no significant change of the number of nodes or the network topology is expected during normal phase, it is still allowed to add more nodes (therefore, branches) at any level of the tree, only if additional addresses (reserved during initialization phase) are available. If there is a significant change of the number of nodes or network topology, which cannot be handled during normal phase, the network can go through the initialization phase again.

An exemplary embodiment of the present invention adopts a link state routing scheme. In the basic link state scheme, each node maintains a link state table (LST) for all its neighbors within maxHops (a parameter determined by specific application) hops. Each neighbor's block address is logged in the LST so that the whole branch below the neighbor is routable. To forward a data packet, the LST is first queried and the best path (it is possible that multiple paths are found) is used; if no path found in the LST, the packet is forwarded to the parent.

Figure 2:
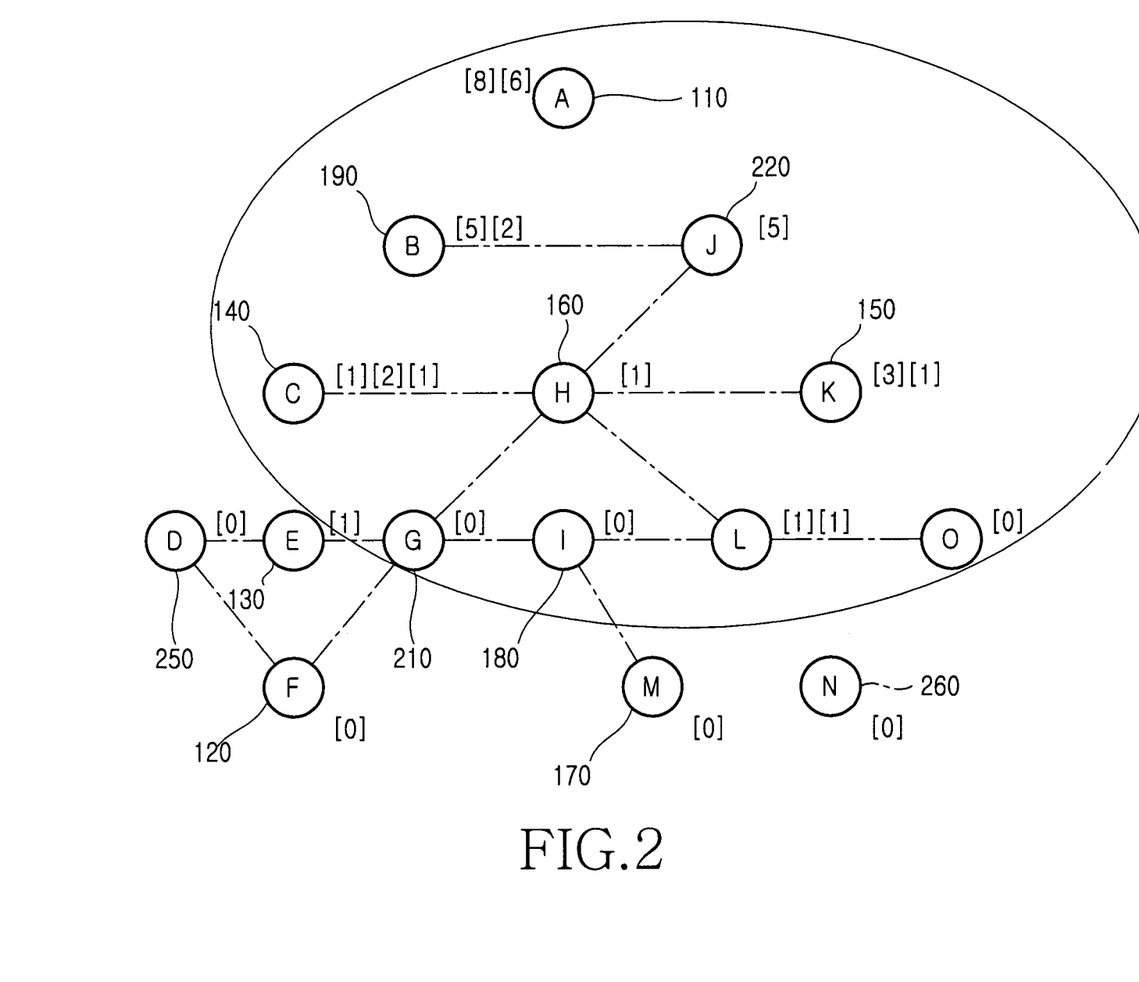
FIG. 2 is a graph illustrating a wireless network for explaining a basic link state scheme according to an exemplary embodiment of the present invention.

FIG. 2 is a graph for explaining a routing method of a wireless network adopting a basic link state scheme according to an exemplary embodiment of the present invention. In FIG. 2, a 2-hop link state view of node J 220 for the basic link state scheme is shown. Note that, unlike node K150, nodes D, E, F, M, and N (250, 130, 120, 170 and 260, respectively) are not within 2 hops of node J 220, but they are still directly routable since they are the children of those routable neighbors of node J 220.

Compared with the pure adaptive tree, the link state routing provides shorter paths on average. Also, SPFs of conventional tree routing are eliminated in most cases.

In the extended link state scheme, a node is not forced to use the predetermined maxHops parameter to build its LST. Although nodes are still required to exchange maxHops neighbor information, a node can build a LST for linkhops-hop neighbors (linkHops<=maxHops), depending on the node density around it. In general, a node uses a large linkHops if the node density is small around it, and vice versa. One of the exemplary goals of using link state routing is to bypass the broken tree route. With high node density, a node is likely to find more paths that can be used to bypass a broken tree route. This improved reliability enables a node to build a relatively small LST.

If the node density is very low around an area, even a linkHops as large as maxHops may not be enough. One solution is to allow nodes in this area to use a linkHops that is larger than maxHops. But since only maxHops hop information is exchanged by default, all nodes in this area need to exchange linkHops (larger than maxHops in this case) hop information again. Here this exemplary embodiment proposes another more efficient approach. After the basic LST is built, each node checks if it has multiple paths to each of the neighbors within linkhops hops. If not, it unicasts its complete LST to those neighbors. Upon receiving the LST, a node will unicast back its LST to the source. This in effect creates a 2×linkHops hop LST between related nodes.

Figure 3:
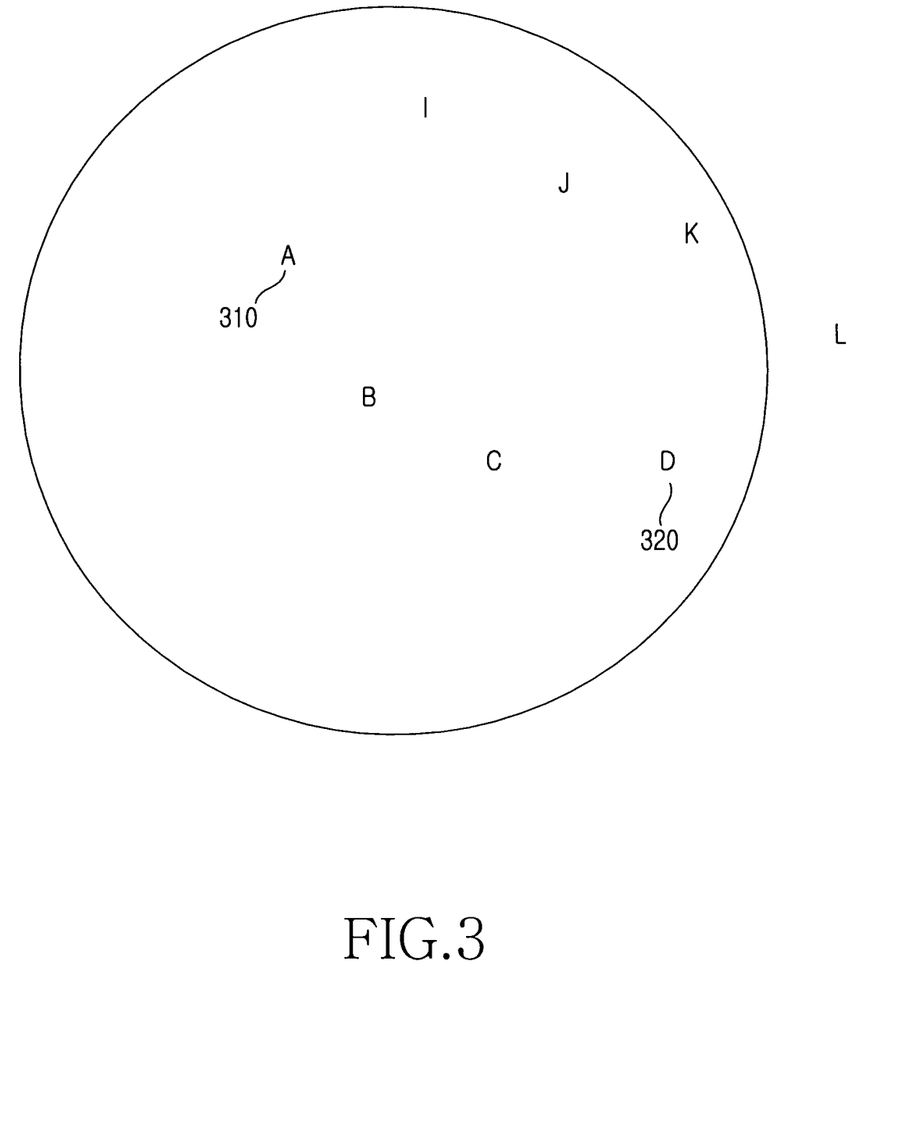
FIG. 3 is a graph illustrating a wireless network for explaining an extended link state scheme according to an exemplary embodiment of the present invention.

FIG. 3 is a graph for explaining a routing method of a wireless network using an extended link state scheme according to an exemplary embodiment of the present invention. In FIG. 3, after the basic LST is built, node A 310 finds that it only has one path to node D 320 within linkhops (here 3) hops. So it will exchange LST information with node D 320. And both node A 310 and node D 320 will find out that there is another path between them, that is, A-I-J-K-L-D. Then each of them records this path in the LST and also unicast a message (with a TTL of linkHops) to notify nodes I, J, K, and L so that those nodes can also update their LSTs. Finally, a second path is detected between node A 310 and node D 320. Among all the neighbors within linkHops hops, the ancestors and descendents of a node (according to the tree structure) are more important than other nodes. So optionally a node can handle its neighbors differently. For example, only guarantee that multiple paths are available to ancestors and descendents, or keep more hop link state of ancestors and descendents that that of other nodes.

In summary, the extended link state scheme according to exemplary embodiments of the present invention can be more reliable, efficient and adaptive than the basic link state scheme.

After the tree formation, nodes exchange link state information by periodically broadcasting several Hello messages with a TTL of maxHops. An example of a Hello message format is given in table 3.

TABLE 3

| begAddr | endAddr | tree_level | oh_neighbor$_1$, oh_neighbor$_2$, ..., oh_neighbor$_k$ |
|---|---|---|---|
| | begAddr: | \multicolumn{2}{l}{beginning address of the address block owned by the node (this is also the address assigned to the node itself)} |
| | endAddr: | \multicolumn{2}{l}{ending address of the address block owned by the node} |
| | tree_level: | \multicolumn{2}{l}{tree level of the node} |
| | oh_neighbor$_k$: | \multicolumn{2}{l}{one-hop neighbor of the node} |

The link state table of a node, which consists of a maxHops-hop neighbor list, as shown in table 4 and a connectivity matrix as shown in table 5, is updated upon the reception of each Hello message.

Each node updates its neighbor list upon the reception of each Hello message. Note that not only the source of the Hello message is added into the neighbor list but also the one-hop neighbors of the source, with the endAddr and tree_level marked as "unknown" temporarily. The "unknown" endAddr and tree_level is replaced with actual values when a Hello message is received from the corresponding neighbor. If no Hello message is received from some neighbors during the whole Hello message exchange procedure, a node can solicit for endAddr and tree_level information by broadcasting a message to its one-hop neighbors, including all the neighbors whose endAddr and tree_level are missing. Each one-hop neighbor received the message will reply if it can provide the endAddr and tree_level information of one or more neighbors included in the message. The field hops is calculated according to the connectivity matrix.

TABLE 4

| begAddr$_1$ | endAddr$_1$ | tree_level$_1$ | hops$_1$ |
| begAddr$_2$ | endAddr$_2$ | tree_level$_2$ | hops$_2$ |
| ... | ... | ... | ... |
| begAddr$_n$ | endAddr$_n$ | tree_level$_n$ | hops$_n$ |

From the one-hop neighbor information included in each Hello message, a node can construct a connectivity matrix for neighbors recorded in the neighbor list. Table 5 illustrates one example of the connectivity matrix.

TABLE 5

|  | me | nb$_1$ | nb$_2$ | nb$_3$ | ... | nb$_{n-2}$ | nb$_{n-1}$ | nb$_n$ |
|---|---|---|---|---|---|---|---|---|
| me | – | – | + | – | ... | – | + | – |
| nb$_1$ |  | – | + | – | ... | + | – | – |
| nb$_2$ |  |  | – | + | ... | – | – | – |
| nb$_3$ |  |  |  | – | ... | + | – |  |
| ... |  |  |  |  | ... | ... | ... | ... |
| nb$_{n-2}$ |  |  |  |  |  | – | – | + |
| nb$_{n-1}$ |  |  |  |  |  |  | – | – |
| nb$_n$ |  |  |  |  |  |  |  | – |

Note:
(1) The plus or minus sign ("+" or "–") at the cross cell of two nodes indicates they are or are not directly connected (i.e., they are, or are not one-hop neighbors);
(2) For bi-directional links, the matrix is symmetric, so only half of the matrix is needed as shown here.
(3) Hop information can be calculated using the connectivity matrix. In this embodiment: 1-hop neighbors: nb$_2$, nb$_{n-1}$, ... 2-hop neighbors: nb$_1$, nb$_3$, ... 3-hop neighbors: nb$_{n-2}$, ... 4-hop neighbors: nb$_n$ ...

The field hops of each node in neighbor list can be calculated using the connectivity matrix, first the field hops of each node is set to infinity. Then, all nodes directly connected to "me" are one hop neighbors (nb$_2$, nb$_{n-1}$, ... in above example). Next, all nodes directly connected to one-hop neighbor (and having a hops of infinity) are two hop neighbors (nb$_1$, nb$_3$, ... in above example). This procedure continues until hop numbers of all neighbors are populated.

The following pseudo code describes how to select the next hop for data forwarding.

```
1:  func_nextHop(dst)
2:     neighbor_found = search the neighbor
                        list for the lowest (i.e., with the largest tree
                        level) neighbor who is the ancestor of dst but
                        is not my ancestor;
3:     if neighbor_found                              //going down
4:        next_hop = getOneHopNeighbor(neighbor_found);
5:        return next_hop;
6:     else if the destination is not my descendent   //going up
7:        found = is there a neighbor who has a tree level less than mine?
8:        if found
9:           hops2root =   the minimum (hops + tree_level)
                           found among neighbors that have a
                           tree level less than mine;
10:          minHops =     the minimum hops found among neighbors
                           that have a (hops + tree_level)
                           of hops2root;
11:          neighbor_found = select one of the neighbors that have
                              a (hops + tree_level) of hops2root
                              and a hops of minHops;
12:          next_hop = getOneHopNeighbor(neighbor_found);
13:          return next_hop;
14:       else   //should go up, but can't
15:          return no_next_hop;
16:       end if
17:    else    //should go down, but can't
18:       return no_next_hop;
19:    end if
20: end func
21: fun_getOneHopNeighbor(neighbor_found)
22:    mark the hop_number of each neighbor as "infinity";
23:    current_hops = hop number of the neighbor_found;
24:    while current_hops > 1
25:       for each neighbor nb$_i$ with a hop_number of current_hops
26:          for each neighbor nb$_j$ directly connected to nb$_i$
27:             hop_number of nb$_j$ = current_hops - 1;
28:          end for
29:       end for
30:       current_hops = current_hops - 1;
31:    end while
32:    return one of the neighbors with hop_number of 1;
33: end func
```

When multiple neighbors are available for selection (see line 11 and line 32 in the above pseudo code) and there are no other cost metrics indicating one neighbor is preferred over another, it is possible to randomly select one neighbor for load balance purpose. However, to mitigate "out of order" problems, it is better to stick to one neighbor for a while once it is selected (rather than randomly select on neighbor each time). If no next hop can be found due to route failures, a ring search should be performed. Ring search can be done by exchanging Hello messages as in link state generation stage, but with a large TTL.

To reduce communication overhead and interference, no periodic Hello messages are broadcast after the link state generation stage. After the link state generation stage, Hello messages are only broadcast upon the detection of link failures, link recoveries, or new neighbors. If a node misses some Hello messages, its link state may not be accurate. Inaccurate link state can result in not only the selection of detoured routes but, more seriously, routing loops.

One way to promptly detect inaccurate link state without using periodic Hello messages is to include one bit up-down flag and the so-called virtual tree level of the relaying node in the message. The up-down flag indicates whether the previous hop is forwarding the message up or down. The virtual tree level is defined as following equation:

$$\text{virtual\_tree\_level} = \begin{cases} neighborLevel - hops2Nb & \text{(if going down)} \\ neighborLevel + hops2NB & \text{(if going up)} \end{cases} \quad (1)$$

where neighborLevel is the tree level of neighbor_found given in line 21 of the above pseudo code, and hops2Nb is hops to neighbor_found.

Let
flag$_1$=the up-down flag included in an incoming message
vTreeLevel$_1$=the virtual tree level included in an incoming message
flag$_2$=the up-down flag of the receiver of the message
vTreeLevel$_2$=the virtual tree level of the receiver of the message, then it follows that $$\begin{cases} vTreeLevel_2 - vTreeLevel_1 \geq 1 & (\text{if } flag_1 = \text{down}) \\ vTreeLevel_1 - vTreeLevel_2 \geq 1 \text{ or } flag_2 = \text{down} & (\text{if } flag_1 = \text{up}) \end{cases} \quad (2)$$

Note that, if the receiver calculates flag$_2$ and vTreeLevel$_2$ using only (maxHops−1)-hop link state information (that is, one hop less than that used by previous hop), then only the equal sign "=" should be applied in equation (2).

A more efficient way is to only include the up-down flag and the hops2Nb value in the message. Similarly the parameters are defined as follows:

flag$_1$=the up-down flag included in an incoming message
hops2Nb$_1$=the hop2Nb value included in an incoming message
flag$_2$=the up-down flag of the receiver of the message
hops2Nb$_2$=the hop2Nb value of the receiver of the message If all the above values are calculated using maxHops-hop link state information, then there is no relationship between hops2Nb$_1$ and hops2Nb$_2$. This can be seen from equations (1) and (2). Equation (2) gives relationship between two virtual_tree_levels. There is no relationship between two neighbor-Levels if they are both calculated using maxHops link state information (the previous hop and the receiver have different maxHops link state information). Thereby, according to equation (1), there is no relationship between hops2Nb$_1$ and hops2Nb$_2$ either. Based on above, maxHops-hop link state information is used to calculate (flag$_1$, hops2Nb$_1$), but only (maxHops−1)-hop link state information to calculate (flag$_2$, hops2Nb$_2$). In this case, it should be:

$$\begin{cases} hops2Nb_1 - hops2Nb_2 = 1 & (\text{if } hops2Nb_1 > 1) \\ \text{the destination is my descendent} & (\text{if}(hops2Nb_1 = 1) \text{ and } (flag_1 = \text{down})) \\ receTreeLevel - preHopTreeLevel \geq 1 & (\text{if}(hops2Nb_1 = 1) \text{ and } (flag_1 = \text{up})) \end{cases} \quad (3)$$

If equation (2) or (3) does not hold, the link state information of the previous hop or/and the receiver is inaccurate. In this case, the receiver sends its (maxHops−1)-hop connectivity matrix to previous hop, who then compares the received connectivity matrix with its own and notifies all its neighbors that are related to any mismatch record of the two connectivity matrices. Any node being notified broadcasts several Hello messages to update the link state of its neighbors.

A node should broadcast several Hello messages with a TTL of maxHops if it detects its one-hop connectivity has changed due to link failures, link recoveries, or the detection of new neighbors. Transmission failures can be caused by link failures (including node failures), collisions, or background interference. So bringing down a route each time a transmission fails is not a good practice. In an exemplary embodiment of present invention, a neighbor to which a transmission has failed is first put in a probe list. A neighbor in the probe list can have a state of either unknown or down. A neighbor with an unknown state is probed each probe Interval seconds after the last probe using a timer (timer-driven) or probed immediately each time it is selected to be the next hop of a data transmission (data-driven). Although the neighbor with an unknown state can still be selected as the next hop like a normal neighbor, it is not actually used for transmitting any data packet. All data packets having this neighbor as the next hop are buffered or dropped if no enough memory.

The probe continues until the link to the neighbor is recovered or the total probe number, including both timer-driven probes and data-driven probes, reach max_probe_num.

If a link is recovered, the corresponding neighbor is removed from the probe list and all packets buffered for this neighbor, if any, are forwarded to this neighbor. A link is considered recovered if a MAC ACK of a probe (if the routing layer have access to status of MAC ACK) is received or any packet including the reply of a probe is received from that neighbor by the routing layer (or overheard by the MAC if overhearing is supported).

If the probe number reach max_probe_num before the link is recovered, the state of the neighbor is changed to down. The connectivity matrix is updated accordingly and Hello messages is broadcast with a TTL of maxHops. After the broadcast of the first Hello message, all packets buffered for the neighbor, if any, is routed via other routes. Note that data packets should not be routed via other routes before the original next hop is determined down and all maxHops-hop neighbors are informed of this by Hello messages. The reason is that it is possible, though the probability is not high, that data packets are forwarded back to the current node since other nodes do not know the original next hop is down.

The neighbor remains in the probe list if the link to the neighbor has been determined down, but it is probed only by timer (it will not be used as the next hop of any data packet) and the probe interval is increased after each probe, up to a maximum value max_probe_interval. For example, a neighbor with a state of down can be probed using intervals 2, 4, 6, ..., max_probe_interval seconds. This facilitates, if the link recovers, detection of the link within no more than max_probe_interval seconds.

While the invention has been shown and described with reference to certain embodiments thereof, it will be understood by those skilled in the art that various changes in form and details may be made therein without departing from the spirit and scope of the invention as defined by the appended claims and their equivalents.

What is claimed is:

1. A routing method of a wireless communication network comprising a plurality of nodes, the method comprising:
   generating, at each node, an adaptive tree table which defines the network in a tree structure comprising branches and the nodes;
   generating, at each node, a link state table which comprises information on neighbor nodes; and
   routing packets, from a particular one of the nodes, on the basis of the particular node's adaptive tree table and link state table, wherein:
   each adaptive tree table identifies the number of descendent branches connected to the corresponding node, when a reported total number of nodes in the network is less than a total number of addresses available for assignment, and an address block assigned to each of the branches.

2. The method of claim 1, wherein generating each adaptive tree table comprises:
   initializing the adaptive tree table;
   determining whether the network changed; and
   modifying the adaptive tree table if the network changed.

3. The method of claim 2, wherein initializing each adaptive tree table comprises:
   associating the corresponding node and each of its descendent nodes with branches and identifying the corresponding node and each of its descendent nodes as a root node, an intermediate node, or a leaf bottom node; and
   assigning addresses to the associated nodes.

4. The method of claim 3, wherein associating the nodes comprises considering a capability of the corresponding node when deciding whether to accept another node as a child.

5. The method of claim 4, wherein the node capability is indicated by an acceptance degree.

6. The method of claim 5, wherein the acceptance degree comprises at least one of an accept without reservation, an accept with reservation, an accept with reluctance, and a reject.

7. The method of claim 3, wherein assigning the addresses comprises:
   determining if the total number of nodes of the network is equal to or less than the total number of available addresses; and
   allocating addresses to the nodes if the total number of nodes is equal to or less than the total number of available addresses.

8. The method of claim 7, wherein determining the total number of nodes comprises:
   receiving, at each node, the number of descendent nodes descending from each descendent branch; and
   calculating, at the root node, the total number of nodes by summing the numbers of descendent nodes received by the root node.

9. The method of claim 1, wherein generating each link state table comprises:
   exchanging link state information among node neighbors within a number of hops; and
   updating the link state table on the basis of the link state information.

10. The method of claim 9, wherein the exchanged link state information comprises beginning and ending addresses of an address block assigned to the corresponding node, a tree level of the corresponding node in the corresponding adaptive tree table, and the identities of one-hop neighbors of the node.

11. The method of claim 9, wherein each link state table comprises a maximum-hop neighbor list and a connectivity matrix.

12. The method of claim 11, wherein the maximum-hop neighbor list comprises a beginning address of an address block belonging to an nth node (begAddrn), an ending address of the address block belonging to the nth node (endAddrn), a tree level of the nth node in the corresponding adaptive tree table (tree_leveln), and the number of hops to the nth node (hopsn).

13. The method of claim 12, wherein the number of hops to the nth node (hopsn) is calculated using the corresponding connectivity matrix.

14. A routing method of a wireless communication network comprising a plurality of nodes, the method comprising:
   generating, at each node, a first table to define a direction a packet is to be relayed in the communication network;
   indicating, by each node of the plurality of nodes, the number of addresses to be assigned;
   deriving, in each node, next hop information from the node's local link state table; and
   routing packets, from a particular one of the nodes, based on the particular node's defined packet direction and next hop information, wherein
   each first table identifies the number of descendent branches connected to the corresponding node, when a reported total number of nodes in the network is less than a total number of addresses available for assignment, and an address block assigned to each of the branches.

15. The method of claim 14, wherein generating each first table comprises:
   generating association requests to allow nodes to be added to an adaptive tree; and
   assigning addresses to each of the added nodes.

16. The method of claim 14, wherein routing the packets comprises:
   generating a shortest path between the particular node and another node based on the particular node's first table and next hop information.

17. A routing method of a wireless communication device within a network of other wireless communication devices, the method comprising:
   generating a table to define a direction a packet is to be from the wireless communication device;
   indicating the number of addresses to be assigned;
   generating a local link state table comprising next hop information; and
   routing the packet from the wireless communication device to another wireless communication device based on the wireless communication device's defined packet direction and next hop information, wherein
   the table identifies the number of descendent branches connected to the wireless communication device, when a reported total number of nodes in the network is less than a total number of addresses available for assignment, and an address block assigned to each branch.

* * * * *